United States Patent

[11] 3,633,922

[72] Inventor Minoru Yokota
Tokyo, Japan

[21] Appl. No. 876,093
[22] Filed Nov. 12, 1969
[45] Patented Jan. 11, 1972
[73] Assignee Pioneer Electronic Corporation
Tokyo, Japan
[32] Priority Nov. 11, 1968
[33] Japan
[31] 43/97523

[54] INTERLOCKING MECHANISM FOR HOLDING A TAPE CARTRIDGE IN INSERTED POSITION
6 Claims, 5 Drawing Figs.

[52] U.S. Cl. .......... 274/4 B, 74/527
[51] Int. Cl. .......... G11b 5/00
[50] Field of Search .......... 74/527, 533; 274/4 B, 11 B, 4 E, 4 F; 179/100.2 Z

[56] References Cited

UNITED STATES PATENTS

| | | | |
|---|---|---|---|
| 3,009,024 | 11/1961 | Eash | 274/4 B |
| 3,037,093 | 5/1962 | Nowlan | 179/100.2 Z |
| 3,188,091 | 6/1965 | Goodell | 274/11 E |
| 3,439,184 | 4/1969 | Neapolitakis | 274/4 B |
| 3,481,607 | 12/1969 | Jenkins | 179/100.2 Z |
| 3,485,500 | 12/1969 | Loeschner | 274/4 B |
| 3,492,005 | 1/1970 | Ueno | 179/100.2 Z |
| 3,507,501 | 4/1970 | Lear | 274/4 B |

*Primary Examiner*—Milton Kaufman
*Attorney*—Sughrue, Rothwell, Mion, Zinn & Macpeak

ABSTRACT: A solenoid is energized by a pushbutton switch actuated by insertion of a cartridge within a tape player recess for electromagnetically pivoting an interlocked roller into a formed recess within the cartridge to retain the tape cartridge in inserted position.

INVENTOR
MINORU YOKOTA

BY Sughrue, Rothwell, Mion, Zinn & Macpeak

ATTORNEYS

INVENTOR
MINORU YOKOTA

BY Sughrue, Rothwell, Mion, Zinn & Macpeak

ATTORNEYS

INTERLOCKING MECHANISM FOR HOLDING A TAPE CARTRIDGE IN INSERTED POSITION

BACKGROUND OF THE INVENTION

1. Field of the Invention

This invention relates to interlock mechanisms for holding a tape cartridge in inserted position within a tape player receiving the same and more particularly to such an interlock mechanism particularly applicable to an eight-track tape cartridge.

2. Description of the Prior Art

Conventionally, in an eight-track player (an automobile stereo player, or home stereo player of the eight-track variety), the mechanical interlocking of the eight-track cartridge within the player recess requires, during insertion and removal of the cartridge, movement of the cartridge against a load, which locking load is normally applied by a spring force acting in one direction. This has the inherent defect that it is impossible to insert and remove the cartridge smoothly and, in addition, the structure is complicated by such means.

SUMMARY OF THE INVENTION

The present invention is devised to avoid the above-objections and provides an interlock mechanism for holding an inserted tape cartridge in position within the tape player whereby the utilization of an electromagnet makes the operation of insertion and removing of the cartridge easy and quick, provides smoothness to the operation and allows the structure to be simplified.

The present invention further provides such an interlock mechanism wherein the pressure of the pinch roller which normally acts against a capstan is released when the capstan does not rotate in an automatic manner and, as such, eliminates the deformation of the pinch roller or the tape normally captured between the pinch roller and the driving capsule.

DESCRIPTION OF THE PREFERRED EMBODIMENT

Figure 1:
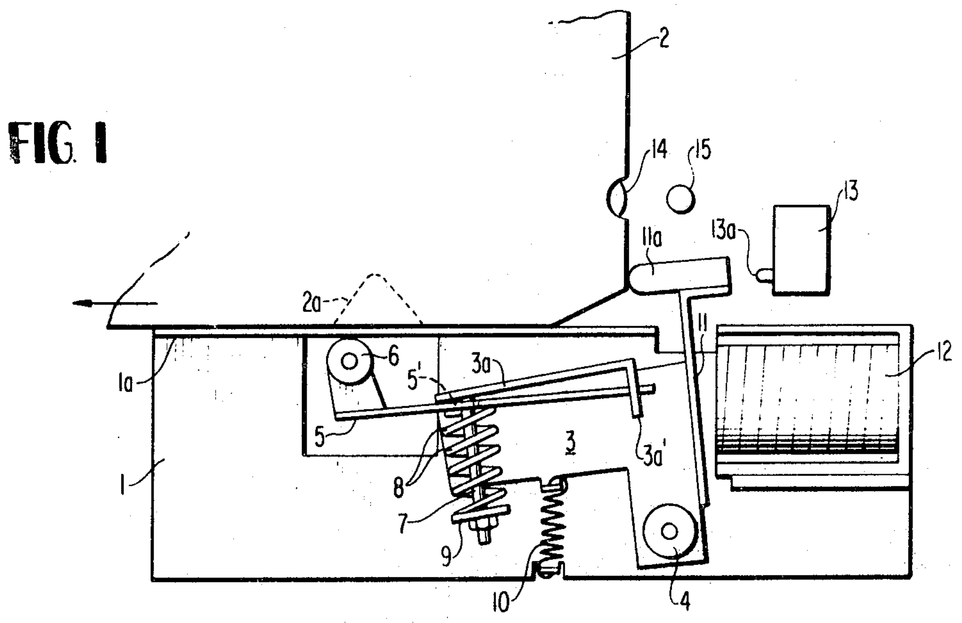
FIG. 1 is a plan view of the interlock mechanism of the present invention prior to insertion of a cartridge within the tape player.

Referring to the drawings, an operating plate 1 is fixed to, and located on the base plate of a magnetic tape player. A guide plate 1*a*, which guides the insertion and removal of cartridge 2, is provided at right angles, and integrally with the operating plate 1 and to one side thereof. Within guide plate 1*a* there is provided integrally a window 1*a'* which overlies a V-shaped recess 2*a* provided within the side of cartridge 2 when the cartridge 2 is fully disposed within the tape player, that is, after full insertion of the same.

Figure 4A:
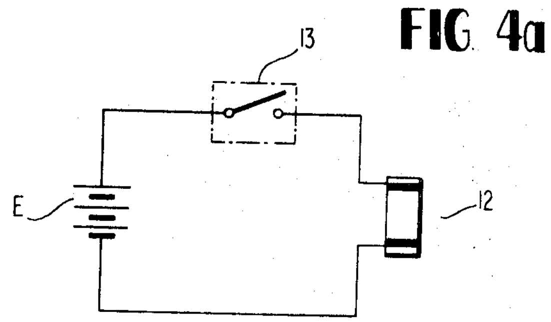
FIG. 4*a* is a diagram of the electrical circuit associated with the interlock mechanism of the present invention.

The operating plate 1 supports a rotary plate 3 which is pivotably mounted on the operating plate 1 by a pivot pin 4. The rotary plate 3 is provided with an L-shaped portion 3*a* which extends perpendicular to the rotary plate at one side thereof. The L-shaped portion 3*a* is further supported by an L-shaped support rod or plate 5 which floats on sidewall 3*a'* of the L-shaped portion 3*a*. The supporting rod or plate 5 carries at its apex, a pressing roller 6 while a guide stick 7 is fixed perpendicular to sidewall 3*a'*, passes through hole 5' at the center of the support rod 5 and is fixed to a stop 9 at its outer end. A compression spring 8 is fixed at one end to the support rod or plate 5 and, on the other end to the back of the stop 9, thus providing the floating support for plate 5. A tension spring 10 biases the rotary plate 3 counterclockwise on operating plate 1 when viewed from above. The rotary plate 3 also carries an absorbing portion or armature 11 which extends vertically upward on another side of the rotary plate. At the apex of the absorbing portion 11, there is integrally provided a push portion or force applying member 11*a* which exerts a pushing force on the front of the inserted cartridge 2. An electromagnet 12 is disposed on the opposite side of the absorbing portion 11 of the rotary blade and at an appropriate distance with the absorbing portion 11 acting as the armature for the electromagnet 12. There is further provided a microswitch 13 which acts to magnetize and demagnetize the electromagnet 12 and, as illustrated in the circuit of FIG. 4*a*, the microswitch 13 and the electromagnet 12 are connected in series to a source of electrical current E. The push pin 13*a* of the microswitch 13 is pushed inwardly by the back of the push portion 11*a* of the rotary plate 3 during insertion of cartridge 2. The cartridge 2 further carries a pinch roller 14 which normally acts on a tape (not shown) to position the same between the pinch roller 14 and a capstan 15 carried by the basic plate of the tape player during full insertion of the cartridge 2.

The operation will be described on the basis of the above-configuration.

Prior to the insertion of cartridge 2 along the side of guide plate 10 of the operating plate 1, as shown in FIG. 1, the rotary plate 3 is rotated counterclockwise by the tension of spring 10. Therefore, a predetermined distance is maintained between the back of the push portion 11*a* of the rotary plate and the microswitch 13 and between the absorbing portion 11 of the rotary plate 3 and the electromagnet 12. When the cartridge is inserted along the guide plate 10, the push portion 11*a* contacts the front of the inserted cartridge 2 causing the rotary plate 3 to rotate clockwise about axis 4. This causes the pressing roller 6 to project through the window 1*a'* of the guide plate 1*a* and to move into the V-shaped recess within the side of the cartridge 2. When the absorbing portion 11 (acting as the armature of the electromagnet), comes within the sphere of influence of the electromagnet, and the microswitch 13 is closed by push portion 11*a*, the electromagnet 12 acts on the absorbing portion 11 and hence the pressing roller 6 is maintained within the V-shaped cut or recess 2*a* against the bias of the spring 10. In this case the cartridge 2 is held magnetically because the compression spring 8 acts on the pressure roller 6 to return the roller to the position of FIG. 1.

Figure 2:
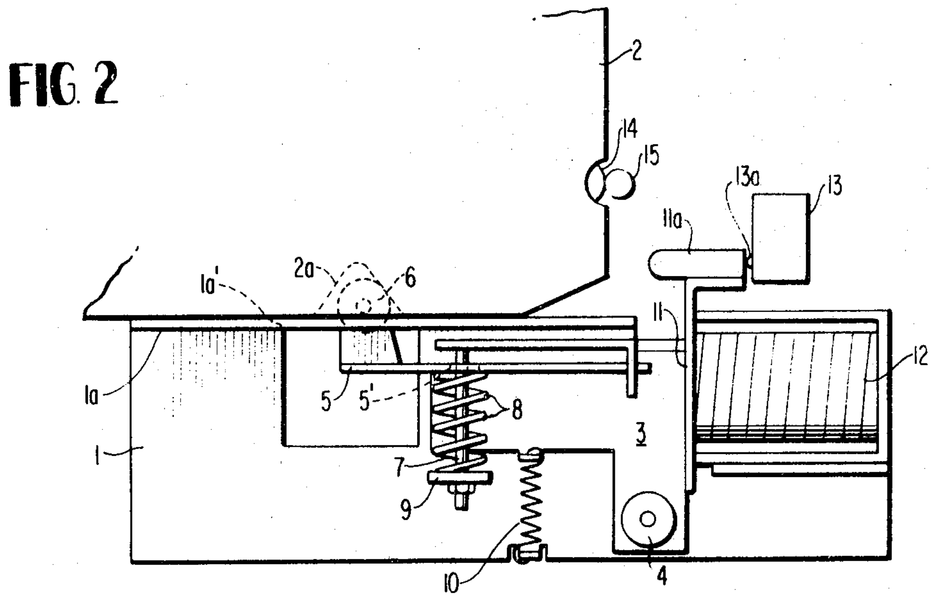
FIG. 2 is a plan view similar to FIG. 1 after insertion of the cartridge.
Figure 3:
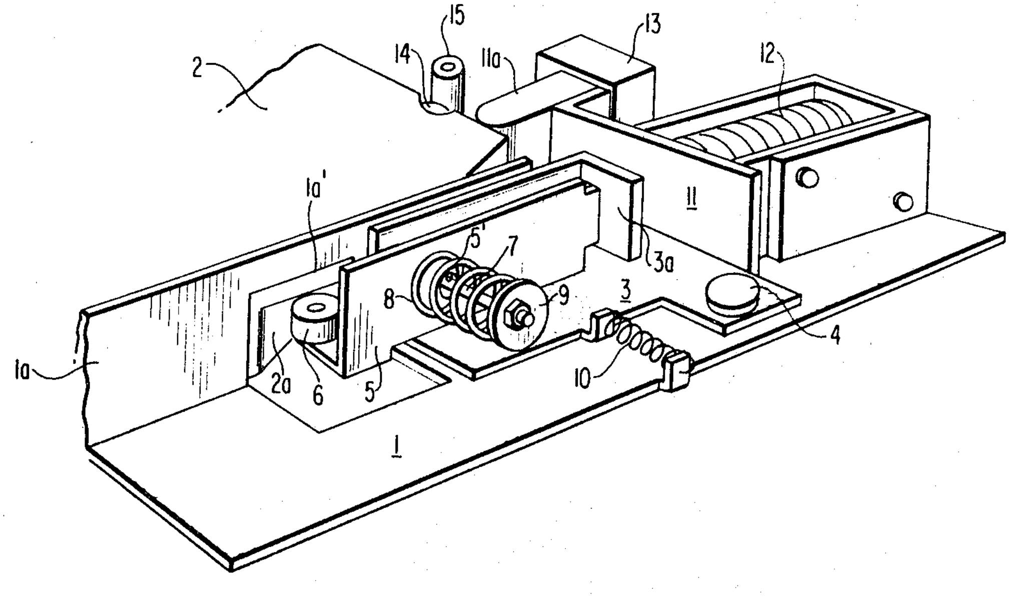
FIG. 3 is a perspective view of the same after insertion.
Figure 4B:
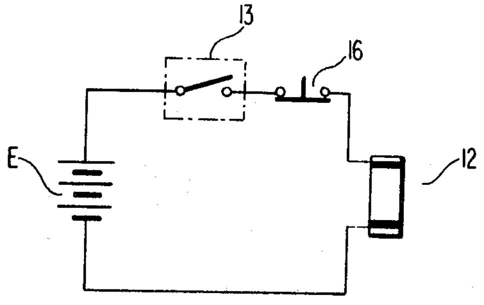
FIG. 4*b* is a diagram of an electrical circuit in modified form for the interlock mechanism of the present invention.

In removing the cartridge 2, if the cartridge 2 is pulled a little away from the inner end of the recess receiving the same, to a location where the microswitch 13 opens, the electric current to the electromagnet 12 is, of course, interrupted. Consequently, the rotary plate 3 rotates counterclockwise about axis 4 due to the force of the biasing spring 10 and the pressing roller 6 is removed from the V-shaped recess or cut 2*a* of the cartridge 2. Hence it is possible to easily remove the cartridge. In the above embodiment, the supply and interruption of electrical current are performed by the microswitch 13. However, if a normally closed switch 16 is provided in the circuit, such as in the modification of FIG. 4*b*, it is possible to perform the removal operation of cartridge 2 in an increasingly smooth manner. If the circuit of FIG. 4*b* is applied to the mechanical arrangement of FIGS. 1, 2 and 3, in similar fashion to the embodiment of FIG. 4*a*, the microswitch 13 is closed and the magnet 12 is excited by the insertion of cartridge 2, but in removing cartridge 2, in the manner of FIG. 2, it is sufficient to open the circuit by opening the normally closed switch 16. Then the magnetic coupling between electromagnet 12 and the absorbing portion 11, is released and the rotary plate 3 is restored to its original position by the force of biasing spring 10. In this case, the cartridge 2 is pushed out in the direction of the arrow by the push portion 11*a* which is integral with the rotary plate 3.

In the present invention, the operation of the normally closed switch 16 is achieved manually but, when applied to an automobile stereo unit or the like, if the normally closed switch 16 is electrically interlocked with the engine ignition key, the cartridge 2 is released slightly when turning off the ignition key and, at the same time, the frictional contact between the pinch roller 14 and capstan 15 is released. Consequently, it is possible to prevent the pinch roller 14 from deforming excessively. Namely, if the pinch roller 14 remains pressed to the capstan 15 for a long time without rotating, the environmental surface of the pinch roller deforms and the deformation causes "wow" and flutter at the time of playing of the tape at all times thereafter. However, if the pinch roller 14 is removed automatically when the ignition key is removed (or turned off), and when playing of the tape cartridge is unnecessary, it is possible to automatically prevent the above defect.

As described above, in the present invention, the armature or magnetic portion follows the movement of the pressing roller 6 and is rotated by the force of insertion of the cartridge to the extent where this armature or portion comes into the sphere of influence of the electromagnet (once it is energized) and is such that the electromagnet 12 is excited a moment before the full insertion position of the cartridge to thus magnetically attract the absorbing portion 11 of the cartridge. The cartridge 2 is thus held by the pressing roller 6, so that the electromagnet requires only the force to magnetically maintain the armature or absorbing portion 11 in contact therewith and, hence, it is possible to achieve adequate operation by an electromagnet of comparatively small capacity, since this electromagnet does not have to drive the armature 11 over a large distance.

What is claimed is:

1. An interlock mechanism for maintaining a tape cartridge within a tape player recess receiving the same, said interlock mechanism comprising: a rotary plate pivotably supported by said player and biased into noninterlock position, means carried by said rotary plate and movable therewith for interlocking said cartridge by contact therewith, means carried by said plate for contact with said cartridge for causing said plate to rotate toward interlock position, an electromagnet acting on said plate after movement of said plate into interlock position to hold said rotary plate in said interlock position and against said bias, said rotary plate including an armature portion movable toward said electromagnet during insertion of said cartridge to maintain said rotary plate in interlock position upon energization of the same, a microswitch positioned in the path of movement of said rotary plate and adapted to close when said armature moves into proximity to said electromagnet, a source of electrical current and means series connecting said microswitch, said source of current and said electromagnet.

2. The interlock mechanism as claimed in claim 1 further including a normally closed switch series connected with said microswitch in said electrical circuit for releasing said cartridge upon opening of the same.

3. The interlock mechanism as claimed in claim 1 wherein said cartridge includes a V-shaped recess within the side thereof, said rotary plate includes means for supporting a pressure roller thereon for movement within said V-shaped recess.

4. The interlock mechanism as claimed in claim 3 wherein said means for supporting said pressure roller on said rotary plate comprises an upstanding plate portion at right angles to the plane of said rotary plate proper, a stick extending away from said cartridge on one side of said plate, an L-shaped support plate carrying said pressure roller and a compression spring fixed at one end to said plate and to said right-angle stick at the other end with said stick passing through a coaxial opening within said L-shaped support to provide a floating support therefor.

5. An interlock mechanism for maintaining a tape cartridge within a tape player, said tape cartridge including a tape, a V-shaped recess within the side of said cartridge and a pinch roller for feeding said tape, said interlock mechanism comprising:

a rotary plate including an armature portion and a mechanical force applying portion adapted to be in contact with the front face of said tape cartridge, said rotary plate being pivotably supported within said player and biased into noninterlock position by a spring, means supporting a pressure roller on said rotary plate resiliently carried by said rotary plate, an electromagnet acting on said armature portion after movement into interlock position to hold said rotary plate in interlock position, a normally open switch for sensing cartridge play position within said tape player, a normally closed switch series connected with said normally open switch for releasing said cartridge upon opening of the same, a source of electrical current, said normally open switch, said normally closed switch and said electromagnet being series connected; whereby, upon closing of said normally open switch, said electromagnet attracts said armature portion of said rotary plate and said pressing roller is inserted within said V-shaped recess to hold said cartridge in play position and, upon opening of said normally closed switch, said force applying portion of said rotary plate pushes said cartridge out of said tape player under the tension of said spring.

6. The interlock mechanism as claimed in claim 5, wherein said normally open switch is positioned in the path of said rotary plate and is adapted to close when said armature portion of said rotary plate moves into proximity to said electromagnet and said supporting means comprises a plate portion extending at right angles to the plane of said rotary plate proper, a stick extending away from said cartridge on one side of said plate, an L-shaped support plate carrying said pressure roller and a compression spring fixed at one end to said plate and at the other end to said right-angle stick with said stick passing through a coaxial opening within said L-shaped support to provide a floating support for the same.

* * * * *